US011579989B2

(12) United States Patent
Kopetz

(10) Patent No.: US 11,579,989 B2
(45) Date of Patent: *Feb. 14, 2023

(54) FAULT-TOLERANT TIME SERVER FOR A REAL-TIME COMPUTER SYTEM

(71) Applicant: TTTech Computertechnik Aktiengesellschaft, Vienna (AT)

(72) Inventor: Hermann Kopetz, Baden (AT)

(73) Assignee: TTTECH COMPUTERTECHNIK AG, Vienna (AT)

(*) Notice: Subject to any disclaimer, the term of this patent is extended or adjusted under 35 U.S.C. 154(b) by 124 days.

This patent is subject to a terminal disclaimer.

(21) Appl. No.: 17/180,960

(22) Filed: Feb. 22, 2021

(65) Prior Publication Data

US 2021/0328759 A1 Oct. 21, 2021

(30) Foreign Application Priority Data

Apr. 21, 2020 (EP) .................................. 20170666

(51) Int. Cl.
*G06F 11/16* (2006.01)

(52) U.S. Cl.
CPC ...... *G06F 11/1633* (2013.01); *G06F 11/1604* (2013.01)

(58) Field of Classification Search
CPC .... G06F 11/1604; G06F 11/1633; G06F 1/06; G06F 1/12
See application file for complete search history.

(56) References Cited

U.S. PATENT DOCUMENTS

| 9,130,661 B2* | 9/2015 | Poledna | H04J 3/0641 |
|---|---|---|---|
| 10,459,064 B2* | 10/2019 | Olsen | G01S 5/021 |
| 10,585,401 B2* | 3/2020 | Abo El-Fotouh | G04R 20/00 |
| 2002/0065940 A1* | 5/2002 | Suzuki | H04L 9/40 |
| | | | 709/248 |
| 2003/0177154 A1* | 9/2003 | Vrancic | G06F 1/12 |
| | | | 708/160 |
| 2010/0091760 A1* | 4/2010 | Yoon | H04J 3/0658 |
| | | | 370/350 |

(Continued)

OTHER PUBLICATIONS

Question: Which bus is a bidirectional bus? by LearnPick published Jan. 25, 2018 https://www.learnpick.in/questions/details/34083/which-bus-is-a-bidirectional-bus (Year: 2018).*

(Continued)

*Primary Examiner* — Joseph O Schell
(74) *Attorney, Agent, or Firm* — Eversheds Sutherland (US) LLP

(57) ABSTRACT

The invention relates to a method for providing a fault-tolerant global time via a time server in a distributed real-time computer system, wherein the time server comprises four components which are connected to one another via a bi-directional communication channel. At a priori defined periodic, internal synchronization times, each of the four components transmits an internal synchronization message, which is simultaneously transmitted to the other three components, from which each internal computer of a component determines a correction term for the tick counter contained in its component and corrects the reading of the local tick counter by this correction term.

16 Claims, 5 Drawing Sheets

(56) References Cited

U.S. PATENT DOCUMENTS

| | | | | |
|---|---|---|---|---|
| 2011/0246809 | A1* | 10/2011 | Dewhirst | G06F 1/12 |
| | | | | 713/400 |
| 2013/0086432 | A1* | 4/2013 | Bauer | H04L 49/552 |
| | | | | 714/47.3 |
| 2014/0355629 | A1* | 12/2014 | Ito | H04L 69/28 |
| | | | | 370/509 |
| 2015/0063362 | A1 | 3/2015 | Poledna | |
| 2018/0107240 | A1* | 4/2018 | Yu | G06F 1/12 |
| 2018/0295185 | A1* | 10/2018 | Kopetz | H04L 12/44 |

OTHER PUBLICATIONS

Gaderer, G., et al., "Master Failures in the Precision Time Protocol", Precision Clock Synchronization for Measurement, Control and Communication, (2008) ISPCS IEEE International Symposium (six pages).

Kopetz, H., et al., "Combination of Clock-State and Clock-Rate Correction in Fault-Tolerant Distributed Systems", Real-Time Systems, Kluwer Academic Publishers (2006) (pp. 139-173).

Pfeifer, H., et al., "Formal Verification for Time-Triggered Clock Synchronization", Presented at the 7th IFIP International Working Conference on Dependable Computing for Critical Applications, San Jose, CA (1999), published by Dependable Computing and Fault-Tolerant Systems, vol. 12 (20 pages).

Search Report of European Patent Application No. 20170666.0 dated Oct. 2, 2020.

* cited by examiner

FAULT-TOLERANT TIME SERVER FOR A REAL-TIME COMPUTER SYTEM

CROSS-REFERENCE TO RELATED APPLICATIONS

The present application claims priority to and the benefit of European Application No. 20170666.0, filed Apr. 21, 2020, which is hereby incorporated by reference herein in its entirety.

FIELD

The invention relates to a method for providing a fault-tolerant global time via a time server in a distributed real-time computer system.

The invention also relates to a time server for providing a fault-tolerant global time for a distributed real-time computer system.

The invention also relates to a real-time computer system comprising such a time server and external receivers which are supplied with a global time by the time server.

The invention relates to a method for providing a fault-tolerant global time via a time server in a distributed real-time computer system.

The invention also relates to a time server for providing a fault-tolerant global time.

The invention falls within the field of computer technology. The invention relates to a method and a time server for fault-tolerant synchronization of clocks in a distributed real-time computer system.

BACKGROUND

In many distributed real-time computer systems that are used for the automation of technical processes, the introduction of a global time that is available in all computers of the distributed real-time computer system is required. In safety-critical applications that have a very low probability of failure, this global time must be fault-tolerant.

SUMMARY

It is an object of the present invention to provide a method and a time server with which a fault-tolerant time can be established and made available to all computers in the distributed real-time computer system—the external receivers.

This object is achieved using a method mentioned at the outset in that, according to the invention, the time server comprises four components, a first component, a second component, a third component and a fourth component, wherein the first component is connected to the second and the third for the transmission of messages in each case via a bi-directional communication channel, and the fourth component is connected to the second and the third component in each case via a bi-directional communication channel, and wherein each of the four components has an oscillator and a local tick counter, e.g. an internal computer with an oscillator and a local tick counter, wherein after a power-up the local tick counter of each component is initialized with an identical value, preferably the value zero, wherein the value of the local tick counter of a component is increased in each period of the component's oscillator by a fixed value, preferably by the value 1, wherein in a start-up phase after power-up of the time server one of the four components, e.g. the first component, transmits a start-up message with the current reading of its local tick counter at the time the start-up message is transmitted to the other components, and wherein each receiver of the start-up message sets its local tick counter to the value contained in the start-up message, corrected by an a priori known transport delay of the start-up message, and wherein at a priori defined periodic, internal synchronization intervals, each of the four components simultaneously transmits to the other three components an internal synchronization message containing the reading of its local tick counter at the time the internal synchronization message is transmitted simultaneously to the other three components, and wherein each receiver of an internal synchronization message records the reading of its local tick counter at the time of reception of the internal synchronization message, and determines the time difference between the time of transmission contained in the internal synchronization message and the recorded time of reception of the internal synchronization message, corrected by the a priori known delay of the internal synchronization message and wherein each internal computer of a component determines a correction term for the tick counter contained in its component from these time differences according to a fault-tolerant clock synchronization algorithm and corrects the reading of the local tick counter by this correction term, and wherein two of the four components, e.g. the first component and the third component, each form an external synchronization message that contains an a priori defined external time of reception of this external synchronization message, wherein both external synchronization messages contain the same external time of reception, and simultaneously transmit these external synchronization messages, each via a communication channel directly to one of the other components, but not to the same of the two other components, e.g. the first component to the second component and the third component to the fourth component, at a priori defined periodic external synchronization times, and wherein each of the components of the time server to which an external synchronization message has been transmitted verifies whether the external time of reception contained in the received external synchronization message and measured regarding the reading of its local tick counter at the time the external synchronization message was received is set as it is specified by an a priori planning of the external synchronization time and the external time of reception, and if this is not the case, discards the external synchronization message, and if this is the case, forwards the external synchronization message via an external communication controller of the component to an external receiver at a time, in particular a time defined a priori, which ensures that the external synchronization message arrives at the external receiver at the external time of reception contained in the external synchronization message, and wherein each external receiver records the time the first incoming external synchronization message is received with its local clock and then corrects the reading of its local clock by the difference between the recorded time of reception of the external synchronization message and the external time of reception contained in the external synchronization message.

Furthermore, if this object is achieved using a time server mentioned at the outset, wherein according to the invention, the time server comprises four components, a first component, a second component, a third component and a fourth component, wherein the first component is connected to the second and the third for the transmission of messages in each case via a bi-directional communication channel, and the fourth component is connected to the second and the third component in each case via a bi-directional communication channel, and wherein each of the four components has an oscillator and a local tick counter, e.g. an internal computer with an oscillator and a local tick counter, wherein after a power-up the local tick counter of each component is initialized with an identical value, preferably the value zero, wherein the value of the local tick counter of a component is increased in each period of the component's oscillator by a fixed value, preferably by the value 1, wherein in a start-up phase after power-up of the time server one of the four components, e.g. the first component, is configured to transmit a start-up message with the current reading of its local tick counter at the time the start-up message is transmitted to the other components, and wherein each receiver of the start-up message is configured to set its local tick counter to the value contained in the start-up message, corrected by an a priori known transport delay of the start-up message, and wherein each component is configured to simultaneously transmit to the other three components at a priori defined periodic, internal synchronization intervals an internal synchronization message containing the reading of its local tick counter at the time the internal synchronization message is transmitted simultaneously to the other three components, and wherein each receiver of an internal synchronization message is configured to record the reading of its local tick counter at the time of reception of the internal synchronization message, and to determine the time difference between the time of transmission contained in the internal synchronization message and the recorded time of reception of the internal synchronization message, corrected by the a priori known delay of the internal synchronization message, and wherein each internal computer of a component is configured to determine a correction term for the tick counter contained in its component from these time differences according to a fault-tolerant clock synchronization algorithm and to correct the reading of the local tick counter by this correction term, and wherein two of the four components, e.g. the first component and the third component, are each configured to form an external synchronization message that contains an a priori defined external time of reception of this external synchronization message, wherein both external synchronization messages contain the same external time of reception, and simultaneously transmit these external synchronization messages, each via a communication channel directly to one of the other components, but not to the same of the two other components, e.g. the first component to the second component and the third component to the fourth component, at a priori defined periodic external synchronization times, and wherein each of the components of the time server to which an external synchronization message has been transmitted is configured to verify whether the external time of reception contained in the received external synchronization message and measured regarding the reading of its local tick counter at the time the external synchronization message was received is set as it is specified by an a priori planning of the external synchronization time and the external time of reception, and if this is not the case, is configured to discard the external synchronization message, and if this is the case, is configured to forward the external synchronization message via an external communication controller of the component to an external receiver at a point in time, in particular an a priori defined time, which ensures that the external synchronization message arrives at the external receiver at the external time of reception contained in the external synchronization message.

The external receivers of the real-time computer system record the time the first incoming external synchronization message is received with their local clock then permanently correct the reading of their local clock by the difference between the recorded time of reception of the external synchronization message and the external time of reception contained in the external synchronization message.

The fault-tolerant time server is made up of at least four independent internal components. An internal component—in particular each internal component—includes an oscillator which generates a tick after each movement, a tick counter, particularly a computer with an oscillator and a tick counter, and software for creating a global time from the tick counters of the components. The internal components are connected by means of bi-directional communication channels for the transmission of messages.

The connections of the time server to the outside, to the computers of the distributed real-time system, are preferably unidirectional in order to prevent a corrupt message—a message from an intruder—from getting into the time server from outside.

Immediately after power-up, a synchronized time is created within the time server in the start-up phase of the method, preferably using a central master algorithm [see Kop11, p. 68] that runs in one of the components of the time server. This internal synchronization is then maintained by a distributed, fault-tolerant clock synchronization algorithm [e.g. the FTA algorithm, see Kop11, p. 69].

After the end of the start-up phase, the time server simultaneously transmits two external synchronization messages to the computers of the distributed real-time computer system at a priori defined, periodically recurring points in time. These external synchronization messages have the fail-silent property, i.e. they are either correct or noticeably incorrect.

The following term definitions are made below:

Bi-directional communication channel: A communication channel over which messages can be transmitted in both directions.

Computer of a real-time system: One of the plurality of computers in the distributed real-time computer system that receives synchronization messages from the time server. Synonymous with external receiver.

Receiver of a message (synchronization message): Component of the time server that receives the message from another component of this time server.

External synchronization message: A synchronization message for synchronizing the clocks outside of a time server. According to the invention, an external synchronization message must be fail-silent, i.e. it is either correct or is recognized as incorrect. The error detection of a synchronization message that is incorrect in the value range can be carried out by checking an electronic signature which is contained in the external synchronization message.

External receiver: Every computer in the distributed real-time computer system whose clock is synchronized with global time by external synchronization messages transmitted periodically by the time server.

External time of reception: The a priori defined time at which a correct external synchronization message arrives at the external receiver and which is contained in a payload of the external synchronization message.

External synchronization time: A periodically recurring point in time that is defined as part of the system design and at which an external synchronization message is transmitted from a component of the time server to another internal component of the time server. The external synchronization message is transmitted precisely just to this one internal component, wherein the latter also does not receive external synchronization messages from any other internal components of the time server. The (internal) transmission of the external synchronization messages between two components of the time server takes place directly via a communication line which connects the two components directly, without going through other components.

Fault hypothesis: The assumptions about the faults to be tolerated in a fault-tolerant computer system [Kop11, p. 154].

Fault-tolerant clock synchronization algorithm: An algorithm for the fault-tolerant synchronization of clocks in a distributed computer system [Kop11, p. 69].

Recorded time of reception: The time at which an external synchronization message was received, measured with the clock of the external receiver. The accuracy of the measurement of the recorded time of reception can be improved by a hardware mechanism.

Global time: The time transmitted by the time server, the corresponding ticks of which are within a defined accuracy for all external receivers (see [Kop11, p. 55] regarding the term "accuracy").

GPS time: A worldwide time signal, synchronized with the SI second, which is transmitted by the GPS system and can be received by a GPS receiver [Dan97].

GPS receiver (receiver): An electronic component that receives satellite signals from GPS satellites and that transmits a time signal (expressed in SI seconds) to the time server, in particular to the time server components connected to the GPS receiver [Dan97].

Valid external synchronization message: An external synchronization message is valid if the content of the message matches the signature contained in the message.

Internal synchronization message: A synchronization message for the internal synchronization of the tick counters of the components within a time server. Internal synchronization messages are transmitted between the internal components of a time server.

Internal synchronization time: A periodically recurring point in time that is defined as part of the system design and at which an internal synchronization message is transmitted.

Communication controller: The structural unit within a computer which establishes the connection between an external communication channel and the memory of the computer and which handles the communication protocol.

Component: A computer with an oscillator, a tick counter and the necessary software inside the time server.

SI second: International standard of the second [Tay01].

Start-up message: A message within the time server for internal clock synchronization which is transmitted in the start-up phase.

Start-up phase: A time interval immediately after the power-up of internal components of the time server. During the start-up phase, the tick counters of the components are synchronized using a central master algorithm [Kop11, p. 68].

Independent communication controllers of the time server: Two communication controllers of the time server are independent if they are arranged on or in different internal components.

Time server: An apparatus or a device comprising at least four components for creating a fault-tolerant global time.

Advantageous embodiments of the method according to the invention and the time server according to the invention, which can be provided alone or in any combination with one another, are described below:

Components that generate an external synchronization message can provide this external synchronization message with an electronic signature and the receiver of this external synchronization message can verify based on this electronic signature whether the message is valid and discard the message if it is invalid.

The first component can be connected to the fourth component via a bi-directional communication channel and/or the second component can be connected to the third component via a bi-directional communication channel. Without these additional bi-directional communication channels, which connect diagonally opposite components to one another, a two-stage transmission of the internal messages (for example, a message must run from the first component to the fourth component via the second or third component) has to be accepted, and the resulting delay must be corrected. This can be avoided by the additional bi-directional communication channels.

The time server may comprise or include a GPS receiver, and an external GPS time received via the GPS receiver may be periodically forwarded to one or more of the components of the time server.

From the time server, for example from a component of the time server that is connected to the GPS receiver, the field strength of an incoming signal on the GPS receiver with which the external GPS time is transmitted to the GPS receiver can be checked, or the time provided is examined for sudden changes.

The time interval between two external synchronization messages preferably corresponds to a power of the SI second.

External synchronization messages can each include a data field that contains data about the internal status of the time server.

The time server can be divided into two physically separate subsystems, wherein each subsystem comprises a component that generates external synchronization messages and preferably signs them, as well as a further component that receives this external synchronization message, which is generated by the other component of its subsystem, and wherein the latter component of each sub-system is configured to transmit the external synchronization message to an external receiver.

Both subsystems of the time server can be separated from one another in physical space, for example they can be arranged far enough apart from one another that a physical cause of an error can only affect one of the two subsystems.

The two subsystems can each have an independent power supply.

A GPS receiver can be contained in each of the separate subsystems, or a separate. GPS receiver can be assigned to each subsystem.

BRIEF DESCRIPTION OF THE DRAWINGS

The invention is explained in more detail below with reference to the drawing. In the drawing.

DETAILED DESCRIPTION

Figure 1:
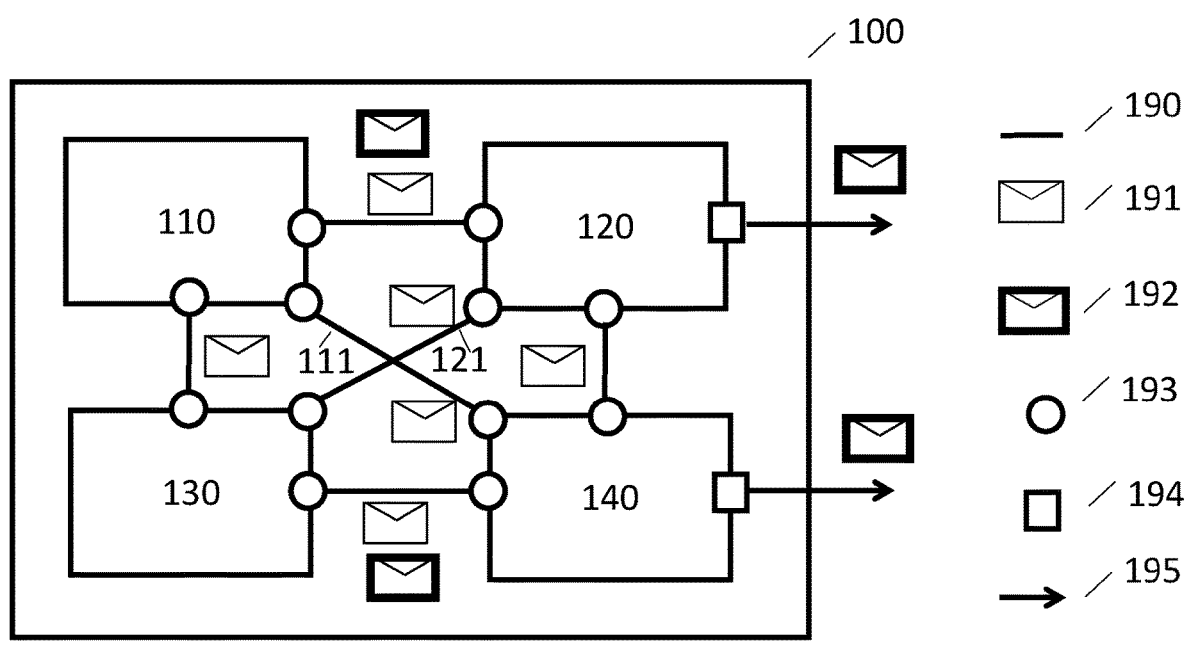
FIG. 1 shows a time server according to the invention having four internal components.

FIG. 1 shows a time server 100 having four components 110, 120, 130, 140, a first component 110, a second component 120, a third component 130 and a fourth component 140.

The first component 110 is connected to each of the other three components, i.e. to the second, third and fourth components 120, 130, 140, the second component 120 to each of the other three components (first, third and fourth) 110, 130, 140, the third component 130 to each of the other three components (first, second and fourth) 110, 120, 140 and the fourth component 140 to each of the other three components (first, second, third) 110, 120, 130 via in each case a bi-directional communication channel 190, 111, 121 for the transmission of messages by means of internal communication controllers 193 of the respective components.

In FIG. 1, a distinction is made between two types of messages, internal synchronization messages 191 and external synchronization messages 192. The external synchronization messages 192 are preferably signed.

In the example according to FIG. 1, each component has three internal communication controllers 193. The three internal communication controllers 193 of a component are able to transport internal synchronization messages 191 in both directions (bi-directionally).

Furthermore, in the example shown, the second and fourth components 120, 140 each have a so-called "external" communication controller 194. These two external communication controllers 194 can transport the external synchronization messages 192 preferably only in one direction (uni-directionally)—in the direction from the time server to the external receivers of the distributed real-time computer system.

The internal communication channels 190 between the components 110 and 120, as well as the components 130 and 140 can be used to transmit both the internal synchronization messages 191 and the external synchronization messages 192.

An external communication controller 194 can also transmit the external synchronization messages 192 to its external receivers via a wireless radio channel. However, it must be ensured that the two communication controllers 194 transmit the two external synchronization messages 192 simultaneously, for example on different frequency bands.

Each of the four components 110, 120, 130, 140 of FIG. 1 has an internal computer with an oscillator and a local tick counter, and software that executes a clock synchronization algorithm. After switching on a component, the power-up, an initialization routine is launched which initializes the local tick counter of each component with the value zero. The value of the local tick counter is increased by 1 per period of the oscillator.

After the power-up, the start-up phase of the time server begins. During the start-up phase, an exceptional component, for example component 110, takes on the role of a central time master. The time master simultaneously transmits an internal start-up message 191 with the contents of its local tick counter at the time of transmission via its three internal communications controllers 193 to the other three components 120, 130, 140. Each (component-internal) receiver 120, 130, 140 of the startup message corrects the tick counter contained in the startup message by an a priori known transport delay of the startup message and writes this corrected value into its tick counter. At this point in time, the local tick counters of all clocks are then synchronized. The time at which an incoming message arrives in a component can be precisely recorded by use of supporting hardware mechanisms.

As part of a system design—a priori—periodic internal synchronization times are defined at which the local tick counters of the components are corrected in order to correct the deviations in their clocks that occurred in the time interval between two internal synchronization times.

Each of the four components simultaneously transmits an internal synchronization message 191 at each internal synchronization time via its three internal communication controllers 193 to all other components of the time server. An internal synchronization message 191 contains the reading of the local tick counter of the respective sender in the payload at the time of transmission.

Each receiver of an internal synchronization message 191 records the reading of its local tick counter at the time the internal synchronization message 191 is received (preferably by hardware mechanisms in communication controller 193).

According to FIG. 1, each component contains three internal synchronization messages 191 via the three internal communication controllers 193. For example, the first component 110 receives an internal synchronization message from each of the components 120, 130, 140.

Each component determines the time differences between the transmission times contained in the internal synchronization messages and the recorded time of receptions, corrected for the a priori known delays of the internal synchronization messages, and transfers these time differences to a fault-tolerant clock synchronization algorithm. In FIG. 1, the clock synchronization algorithm in the first component 110 has four time differences available to it, three from the messages of the components 120, 130 and 140, and the time difference zero from the tick counter of the component 110. (The component 110 assumes that it is correct.)

Fault-tolerant clock synchronization algorithms are described in detail in the technical literature [e.g. Kop11, p. 69]. A fault-tolerant clock synchronization algorithm is executed in each component and determines a correction value for the individual clock from the totality of the determined time differences of all clocks. The tick counter of the individual clock is corrected with this correction value. The term accuracy of an ensemble describes the precision of the internal synchronization [Kop11, p. 55].

As part of the system design, periodic external synchronization times and corresponding time of receptions of an external synchronization message 192 are set at an external receiver. An external synchronization message 192 contains in its payload the planned time of reception of this message at the external receiver and preferably an electronic signature (signature) of the sender, i.e. the creator of the external synchronization messages 192 (in the present case these are the components 110, 130). It is assumed that the sender's electronic signature cannot be forged.

An external synchronization message 192 can also contain in its payload information about the internal state of a component.

Figure 2:
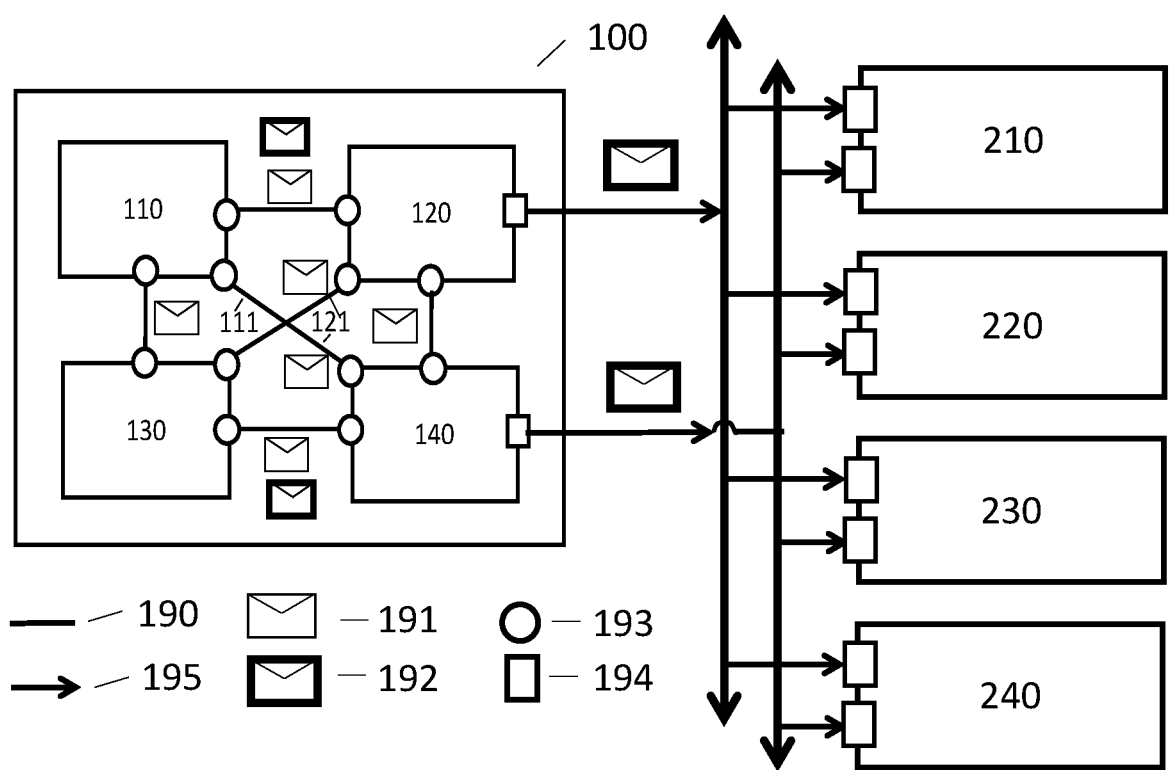
FIG. 2 shows the structure of a distributed real-time computer system having four computers that are supplied with periodic external synchronization messages by a fault-tolerant time server according to FIG. 1.

The periodic synchronization times of the external synchronization messages should preferably be selected such that the time interval between two synchronization messages corresponds to a (negative) power of the SI second. This time difference can be derived from the GPS time, which uses the SI second as the basis for time counting. If the external synchronization messages are synchronized with the GPS time, the time basis of the distributed computer system is synchronized worldwide with all other computers that are based on the GPS time FIG. 2 shows a real-time computer system having four computers 210, 220, 230, 240, which are connected to a fault-tolerant time server according to FIG. 1. The first component 110 of the time server 100 according to FIG. 1 transmits an external synchronization message 192 intended for the computers 210, 220, 230, 240 via its internal communication controller 193 to the internal communication controller 193 of the second component 120. The second component 120 verifies the correctness of the external time of reception contained in the external synchronization message. This external time of reception is valid if the reading of the clock of component 120 at the time of reception of the external synchronization message is within an interval defined a priori before the external time of reception which is contained in the external synchronization message. If the external synchronization message is not valid, it is rejected. Otherwise, the external synchronization message is transmitted from the second component 120 via its unidirectional external communication controller 194 to the computers 210, 220, 230, 240 at a point in time which ensures that the message arrives at the computers 210, 220, 230, 240 at the time of reception contained in the external synchronization message. The second component 120 cannot change the external time of reception contained in the external synchronization message, because this external synchronization message is signed by the first component 110, for example.

The fourth component 140 carries out the method described above simultaneously with respect to the second external synchronization message 192 and transmits it to the computers 210, 220, 230, 240 of the real-time computer system.

The fourth component 140 receives the external synchronization message 192 internally from the third component 130.

In general, it is preferable that two components (here the second and fourth components) simultaneously transmit an external synchronization message to the outside. Each of these two components receives the external synchronization message internally from another—and only from this—component, e.g. the second component receives this from the first component (and only from it) and the fourth component receives this from the third component (and only from it). The component that generates the external synchronization message and transmits it internally to the component assigned to it preferably signs this external synchronization message.

In the structure shown in FIG. 1, it would also be conceivable that internally the first component transmits the external synchronization message (only) to the fourth component and the third component transmits the external synchronization message (only) to the second component.

It is clear to a person skilled in the art that it could of course also be provided that other components (e.g. first and second components) also transmit the external synchronization messages in pairs to the outside, and they internally transmit the external synchronization messages from the other two components, e.g. from the third component and from the fourth component.

FIG. 2 shows four external receivers 210, 220, 230, 240 of the distributed real-time computer system, the clocks of which are supplied with the global time by the fault-tolerant time server 100. Each of these four external receivers receives two external synchronization messages via the two independent external communication controllers 194 from the corresponding components 120, 140 of the time server 100 within the accuracy around the time of reception contained in the external synchronization message.

An external synchronization message arriving at an external receiver is valid if the content of the message matches a signature contained in the message.

The difference between the time the first valid external synchronization message 192 recorded by the external receiver arrives and the time of reception contained in the first valid external synchronization message 192 is used to set the reading of the clock of the external receiver to the received global time. The second external synchronization message 192 arriving later is discarded by the external receiver because it may have been delayed inadmissibly by a defective sender (e.g. by a defective component 120).

The fault hypothesis of a fault-tolerant system indicates which type of faults are tolerated by the system [Kop11, p. 145]. In the present case it is assumed that each component of the time server forms an independent fault containment unit (FCU) and that each FCU can fail in any way, i.e. the type of fault of an FCU is not restricted. Furthermore, the fault hypothesis assumes that only one component of the time server is defective during operation.

If one of the four components of the time server 100 becomes faulty, then this fault is masked by the proposed system architecture of the time server. If, for example, component 110 in FIG. 1 is faulty and transmits an external synchronization message 192, which is intended for external receivers 210, 220, 230, 240, to component 120 at an incorrect point in time, component 120 will detect the message as faulty and discard it. The second external synchronization message 192, which is intended for the external receivers 210, 220, 230, 240, originates from the third component 130 and is checked by the fourth component 140. Since, according to the fault hypothesis, only one component—in this case component 110—can be defective, the second synchronization message will arrive correctly at the external receivers 210, 220, 230, 240.

If the checking component delays an external synchronization message 192 due to a fault, this external synchronization message will arrive at the external receiver after the other valid external synchronization message 192 and will be discarded by the external receiver. If a checking component changes the content of an external synchronization message 192, the external synchronization message 192 becomes invalid and is discarded by the external receiver.

Figure 3:
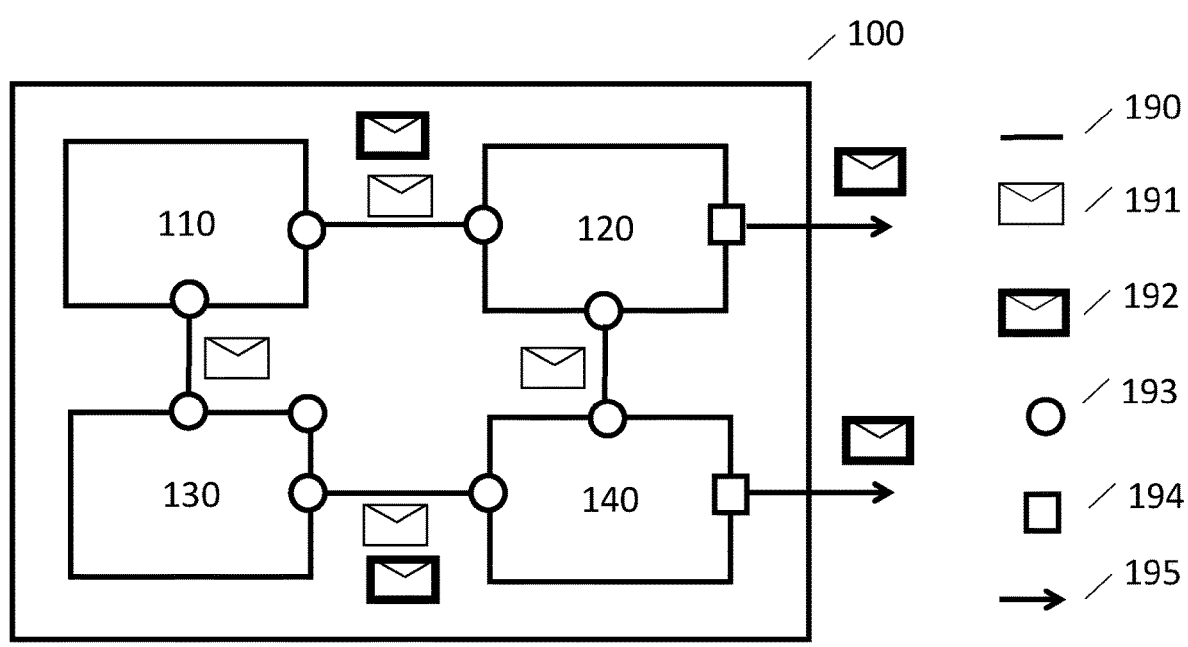
FIG. 3 shows a further embodiment of a time server according to the invention.

FIG. 3 shows a time server 100 in which the communication channel 111 between the first and fourth components 110, 140 of FIG. 1 and the communication channel 121 between the second and third components 120, 130 of FIG. 1 are missing. By omitting these two communication channels, four internal communication controllers 193 and two signal lines can be saved. The price to offset these savings is the introduction of a two-stage transmission of the internal synchronization messages. For example, an internal synchronization message must be transmitted from the first component 110 to the fourth component 140 in the first stage from the component 110 to the component 120 and in the second stage from the component 120 to the component 140. The additional time delay caused by this two-stage transmission method must be corrected in the receiving component 140.

Figure 4:
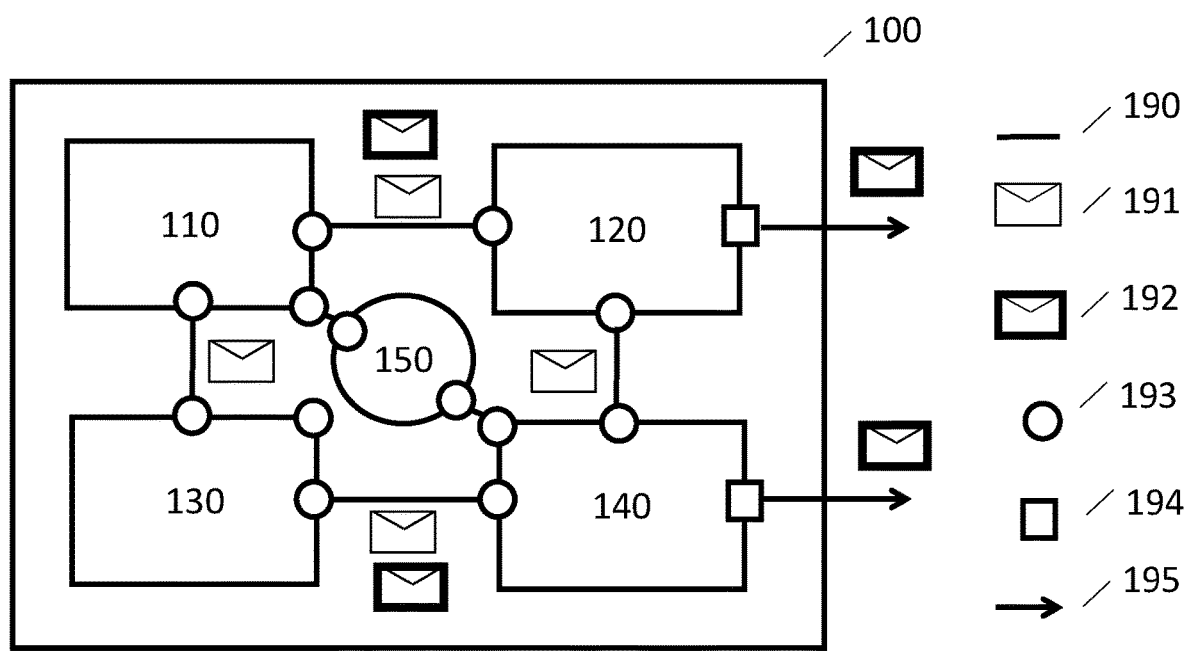
FIG. 4 shows a time server having a receiver for receiving GPS signals to synchronize the global time with the GPS time.

FIG. 4 shows a time server 100 having a GPS receiver 150 for synchronizing the global time with the GPS time. The GPS signal of the Global Positioning System contains a worldwide synchronized time signal with an accuracy of better than 100 nsec. With this signal, the global time of the external receivers can be synchronized worldwide.

It is advantageous if the components of the time server that take over the time signal from GPS receiver 150 check this time signal for plausibility. For example, the dynamics of the field strength of the incoming GPS signals can be monitored, or a sudden change in the time offered can be determined in order to detect an intrusion.

The time server can also have sensors for measuring the environmental parameters in order to compensate for the drift rate of the oscillators caused by these environmental parameters.

Figure 5:
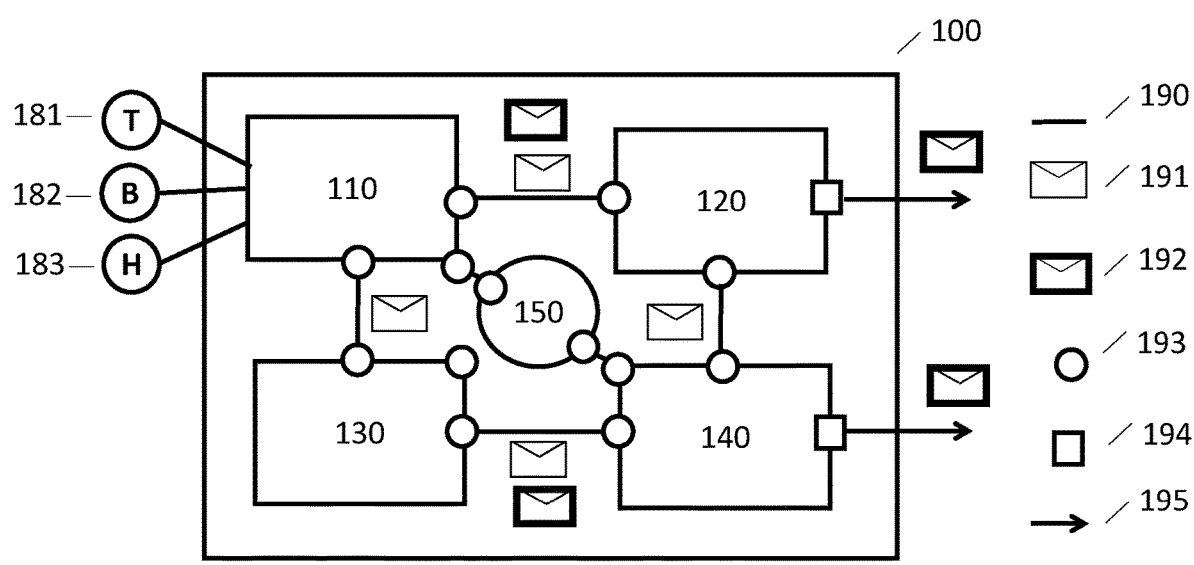
FIG. 5 shows a time server according to the invention according to FIG. 4 having sensors for detecting the state of the environment.

Examples of such environmental parameters are temperature T, barometric pressure B, and humidity H, which can be detected with corresponding sensors 181, 182, 183, as is depicted by way of example in FIG. 5 (based on a time server 100 as shown in FIG. 4).

It goes without saying that the implementation of such sensors can also be provided in the case of time servers as shown in FIG. 1 or 3.

Alternatively or additionally, a GPS receiver can also be implemented in a time server as shown in FIG. 1 or 3.

It can be provided that an external synchronization message 192 contains a further data field in which data about the internal status of the time server 100 is published in order to give an external monitoring system the opportunity to check the internal function of the time server using the external synchronization messages 192. These data can relate to the measured time differences, the calculated correction value of the global time or the field strength of the GPS receiver among other things.

In general, i.e. also for all embodiments of the invention, it is advantageous that the time server is made up of two subsystems, wherein each subsystem has a component 110, 130 that generates (and preferably signs) external synchronization messages, and a further component 120, 140 that receives this external synchronization message generated by the other component of its subsystem, wherein the latter component of each subsystem transmits the external synchronization message to an external receiver. This system structure has the advantage that the subsystems can be arranged at different locations. The failure of a subsystem can be tolerated.

Each subsystem preferably has its own GPS receiver and/or its own power supply.

LITERATURE CITED

[Dan97] Dana, P. H. *Global Positioning System (GPS) Time Dissemination for Real-Time Applications*. Real-time systems. Vol 12. No. 1., pp. 9-40. 1997.

[Kop11] Kopetz, H. *Real-Time Systems, Design Principles for Distributed Embedded Applications*. Springer Verlag. 2011.

[Tay01] Taylor, B. Ed. *The International System of Units*. NIST Special Publication 130. 2001 Edition. National Institute of Standards and Technology (NIST). US Department of Commerce. 2001.

I claim:

1. A method, comprising:
providing a fault-tolerant global time via a time server (100) in a distributed real-time computer system,
wherein the time server (100) comprises four components (110, 120, 130, 140), a first component (110), a second component (120), a third component (130), and a fourth component (140),
wherein for a transmission of messages, the first component (110) is connected to the second and the third component (120, 130) via a bi-directional communication channel (190), and the fourth component (140) is connected to the second and the third component (120, 130) via a bi-directional communication channel (190),
wherein each of the four components (110, 120, 130, 140) comprises an internal computer having an oscillator and a local tick counter,
wherein after a power-up, the local tick counter of each component (110, 120, 130, 140) is initialized with an identical value,
wherein a value of the local tick counter of each component is increased by a fixed value in a period of the component's oscillator,
wherein in a start-up phase after power-up of the time server (100), one of the four components transmits a start-up message with a current reading of the component's local tick counter at a time a start-up message is transmitted to the other three components (120, 130, 140),
wherein a receiver (110, 120, 130) of the start-up message sets its local tick counter to a value contained in the start-up message, corrected by an a priori known transport delay of the start-up message,
wherein, at a priori defined periodic, internal synchronization times, each of the four components (110, 120, 130, 140) simultaneously transmits to the other three components an internal synchronization message containing a reading of its local tick counter at a time the internal synchronization message was transmitted,
wherein a receiver of the internal synchronization message records a reading of its local tick counter at a time the internal synchronization message is received, and determines a time difference between a transmission time contained in the internal synchronization message and a recorded time of reception of the internal synchronization message corrected by a priori known delay of the internal synchronization message,
wherein a single internal computer of a component determines a correction term for the tick counter contained in its component from time differences in accordance with a fault-tolerant clock synchronization algorithm and corrects a reading of the local tick counter by the correction term,
wherein two of the four components each form an external synchronization message (192) containing an a priori defined external time of reception of the external synchronization message, wherein both external synchronization messages contain a same external time of reception, and transmit the external synchronization messages simultaneously at a priori defined periodic external synchronization times each via a communication channel (190) directly to one but not both of the other two components (120, 130), wherein each of the two components (120, 130) of the time server (100) to which the external synchronization message has been transmitted, verifies whether the external time of reception contained in the received external synchronization message measured on a reading of its tick counter at a time the external synchronization message is received is set as it is specified by an a priori planning of the external synchronization time and the external time of reception, and if the external time of reception contained in the received external synchronization message measured on a reading of its tick counter at a time the external synchronization message is received is not set as it is specified by an a priori planning of the external synchronization time and the external time of reception, discards the external synchronization message, and if the external time of reception contained in the received external synchronization message measured on a reading of its tick counter at a time the external synchronization message is received is set as it is specified by an a priori planning of the external synchronization time and the external time of reception, forwards the external synchronization message via an external communication controller (194) of the component (120, 140) to an external receiver at a point in time, which ensures that the external synchronization message arrives at the external receiver at the external time of reception contained in the external synchronization message, and wherein each external receiver records a time a first incoming external synchronization message is received with its local clock and then corrects a reading of its local clock by a difference between a recorded time of reception of the external synchronization message and an external time of reception contained in the external synchronization message.

2. The method according to claim 1, wherein components (110, 130) which generate an external synchronization message provide this external synchronization message with an electronic signature and a receiver of this external synchronization message verifies on a basis of this electronic signature whether the message is valid and rejects the message if it is invalid.

3. The method according to claim 1, wherein the first component (110) is connected to the fourth component (140) via a bi-directional communication channel (111) and/or the second component (120) is connected to the third component (130) via a bi-directional communication channel (121).

4. The method according to claim 1, wherein the time server (100) comprises a GPS receiver (150) and an external GPS time received via the GPS receiver (150) is periodically forwarded to one or more of the components (110, 120), 130, 140) of the time server.

5. The method according to claim 4, wherein a field strength of a signal occurring on the GPS receiver with which the external GPS time is transmitted to the GPS receiver (150) is checked by the time server (100) by a component of the time server (100) which is connected to the GPS receiver (150), or a provided time is examined for sudden changes.

6. The method according to claim 1, wherein the time interval between two external synchronization messages corresponds to a power of an SI second.

7. The method according to claim 1, wherein external synchronization messages (192) each include a data field in which data about an internal state of the time server (100) are contained.

8. A time server (100) for providing a fault-tolerant global time for a distributed real-time computer system, comprising:

four components (110, 120, 130, 140), a first component (110), a second component (120), a third component (130), and a fourth component (140), wherein for a transmission of messages, the first component (110) is connected to the second and the third component (120, 130) via a bi-directional communication channel (190), and the fourth component (140) is connected to the second and the third component (120, 130) via a bi-directional communication channel (190), wherein each of the four components (110, 120, 130, 140) comprises an internal computer having an oscillator and a local tick counter, wherein, after a power-up, the local tick counter of each component (110, 120, 130, 140) is initialized with an identical value, wherein a value of the local tick counter of each component in a period of the component's oscillator is increased by a fixed value, wherein in a start-up phase after power-up of the time server (100) one of the four components is configured to transmit a start-up message with a current reading of its local tick counter at a time a start-up message is transmitted to the other three components (120, 130, 140), wherein a receiver (110, 120, 130) of the start-up message is configured to assign its local tick counter to a value contained in the start-up message, corrected by an a priori known transport delay of the start-up message, wherein each component (110, 120, 130, 140) is configured to simultaneously transmit to the other three components at a priori defined periodic, internal synchronization times an internal synchronization message containing a reading of its local tick counter at a time the internal synchronization message is transmitted, wherein a receiver of the internal synchronization message is configured to record a reading of its local tick counter at a time of reception of the internal synchronization message, and to determine a time difference between a time of transmission contained in the internal synchronization message and a recorded time of reception of the internal synchronization message, corrected by a priori known delay of the internal synchronization message, wherein a single internal computer of a component is configured to determine from time differences a correction term for the tick counter contained in its component in accordance with a fault-tolerant clock synchronization algorithm and to correct a reading of the local tick counter by the correction term, wherein two of the four components are each configured to form an external synchronization message (192), containing an a priori defined external time of reception of the external synchronization message, wherein both external synchronization messages contain a same external time of reception, and transmit the external synchronization messages simultaneously at a priori defined periodic external synchronization times, each via a communication channel (190) directly to one but not both of the other two components (120, 130), wherein each of the two components (120, 130) of the time server (100) to which the external synchronization message has been transmitted is configured to verify whether the external time of reception contained in the received external synchronization message measured on a reading of its tick counter at a time the external synchronization message is received is set as it is specified by an a priori planning of the external synchronization time and the external time of reception, and if the external time of reception contained in the received external synchronization message measured on a reading of its tick counter at a time the external synchronization message is received is not set as it is specified by an a priori planning of the external synchronization time and the external time of reception, is configured to discard the external synchronization message, and if the external time of reception contained in the received external synchronization message measured on a reading of its tick counter at a time the external synchronization message is received is set as it is specified by an a priori planning of the external synchronization time and the external time of reception, is configured to forward the external synchronization message via an external communication controller (194) of the component (120, 140) to an external receiver at a point in time, which ensures that the external synchronization message arrives at the external receiver at the external time of reception contained in the external synchronization message.

9. The time server according to claim 8, wherein the time server is divided into two physically separate subsystems, wherein each subsystem comprises a component (110, 130) that generates external synchronization messages and signs them, as well as a further component (120, 140) that receives the external synchronization message, which is generated by the component of its sub-system, and wherein the further component (120, 140) of each sub-system is configured to transmit the external synchronization message to an external receiver.

10. The time server according to claim 9, wherein the two subsystems are separated from one another in physical space far enough apart from one another that a physical error cause can affect only one of the two subsystems.

11. The time server according to claim 10, wherein the two subsystems each have an independent power supply.

12. The time server according to claim 10, wherein a GPS receiver is included in each of the separate subsystems, or a dedicated GPS receiver is assigned to each subsystem.

13. The time server according to claim 8, wherein the external communication controllers (194) are configured to transmit messages only unidirectionally in a direction from the time server to an external receiver.

14. The time server according to claim 8, wherein components (110, 130) which generate an external synchronization message are configured to provide this external synchronization message with an electronic signature, so that a receiver of this external synchronization message can verify based on this electronic signature whether the message is valid and can discard the message if it is invalid.

15. The time server according to claim 8, wherein the first component (110) is connected to the fourth component (140) via a bi-directional communication channel (111) and/or the second component (120) is connected to the third component (130) via a bi-directional communication channel (121).

16. A real-time computer system comprising the time server (100) according to claim 8, further comprising:

external receivers (210, 220, 230, 240), which the time server (100) supplies with the global time by each external receiver recording a time of reception of a first incoming external synchronization message with its local clock and then correcting a reading of its local clock by a difference between the recorded time of reception of the external synchronization message and correcting an external time of reception contained in the external synchronization message.

* * * * *